United States Patent
Dunphy et al.

(10) Patent No.: US 9,618,981 B2
(45) Date of Patent: Apr. 11, 2017

(54) GUARDING AND SHIELDING ROUTING TRACES IN PROXIMITY SENSORS

(71) Applicant: Synaptics Incorporated, Santa Clara, CA (US)

(72) Inventors: Jim Dunphy, San Jose, CA (US); Robert J Bolender, Davis, CA (US); Adam Schwartz, Redwood City, CA (US); David Hoch, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 262 days.

(21) Appl. No.: 13/843,361

(22) Filed: Mar. 15, 2013

(65) Prior Publication Data
US 2014/0226083 A1    Aug. 14, 2014

Related U.S. Application Data

(60) Provisional application No. 61/764,489, filed on Feb. 13, 2013.

(51) Int. Cl.
  *G06F 1/16* (2006.01)
  *G06F 3/044* (2006.01)
(52) U.S. Cl.
  CPC ............ *G06F 1/1692* (2013.01); *G06F 3/044* (2013.01)
(58) Field of Classification Search
  CPC ........ G06F 3/041–3/045; G06F 1/1692; G06F 17/50
  See application file for complete search history.

(56) References Cited

U.S. PATENT DOCUMENTS

| 6,510,545 | B1* | 1/2003 | Yee et al. ..................... 716/126 |
| 7,692,431 | B2 | 4/2010 | Mackey |
| 8,203,395 | B2 | 6/2012 | Guo et al. |
| 2008/0196945 | A1 | 8/2008 | Konstas |
| 2009/0085885 | A1* | 4/2009 | Wu et al. ..................... 345/173 |

(Continued)

FOREIGN PATENT DOCUMENTS

EP   2538301 A1   12/2012

OTHER PUBLICATIONS

ISA/KR, International Search Report and Written Opinion for International Application # PCT/US2014/016115, pp. 1-14, mailed May 28, 2014 (May 28, 2014).

*Primary Examiner* — Amr Awad
*Assistant Examiner* — Wing Chow
(74) *Attorney, Agent, or Firm* — Osha Liang LLP

(57) ABSTRACT

A capacitive input device has a sensor electrode pattern disposed on a first side of a substrate. The sensor electrode pattern comprises a plurality of sensor electrode elements disposed on the first side of a first substrate. A plurality of routing traces is disposed along a first edge of the sensor electrode pattern on the first side of the substrate and configured to communicatively couple at least some of the sensor electrodes with a processing system. A pair of guard traces is disposed in the same layer as and brackets the plurality of routing traces. A guard overlaps the routing traces, is disposed proximate the routing traces on the first side of the substrate, and ohmically couples the pair of guard traces with one another. A second insulator is disposed between the routing traces and the guard. The second insulator and the first insulator are disposed in the same layer.

10 Claims, 10 Drawing Sheets

(56) References Cited

U.S. PATENT DOCUMENTS

2009/0206845 A1    8/2009  Mackey
2009/0267916 A1*  10/2009  Hotelling .................. 345/174
2011/0037528 A1    2/2011  Guo et al.
2012/0043971 A1*  2/2012  Maharyta .................. 324/658

* cited by examiner

GUARDING AND SHIELDING ROUTING TRACES IN PROXIMITY SENSORS

CROSS-REFERENCE TO RELATED U.S. PROVISIONAL PATENT APPLICATIONS

This application claims priority to and benefit of co-pending U.S. Provisional Patent Application No. 61/764,489 filed on Feb. 13, 2013 entitled "GUARDING AND SHIELDING ROUTING TRACES IN PROXIMITY SENSORS" by Jim Dunphy et al., having, and assigned to the assignee of the present application.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic device.

SUMMARY

In some embodiments, a capacitive input device has a sensor electrode pattern disposed on a first side of a substrate. The sensor electrode pattern comprises a plurality of sensor electrode elements disposed on the first side of a first substrate. A first subset of the plurality of sensor electrode elements are ohmically coupled into groups to form a first array of sensor electrodes oriented along a first axis, and a second subset of the plurality of sensor electrode elements are ohmically coupled into groups to form a second array of sensor electrodes oriented along a second axis which is different from the first axis. A plurality of routing traces is disposed along a first edge of the sensor electrode pattern on the first side of the substrate and configured to communicatively couple at least some of the sensor electrodes with a processing system. A pair of guard traces is disposed in the same layer as the plurality of routing traces such that the pair of guard traces brackets the plurality of routing traces. A guard overlaps the routing traces and is disposed proximate the routing traces on the first side of the substrate. The guard ohmically couples the pair of guard traces with one another. A second insulator is disposed between the routing traces and the guard. The second insulator and the first insulator are disposed in the same layer.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements.

DESCRIPTION OF EMBODIMENTS

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide proximity sensors that may be utilized as input devices. In various embodiments described herein, the proximity sensors discussed are capacitive input devices or portions thereof. Embodiments are associated with guarding and/or shielding routing traces in proximity sensors. In many embodiments described herein, the proximity sensors and routing traces that are discussed are disposed upon glass substrates.

Discussion begins with a description of an example input device with which or upon which various embodiments described herein may be implemented. A non-limiting example of a sensor electrode pattern is described. The example sensor electrode pattern utilizes routing traces to couple signals to and from the sensor electrodes of the pattern and a processing system. The processing system may be implemented as or include an Application Specific Integrated Circuit (ASIC), in various embodiments. The description of the example sensor electrode pattern is followed by description of numerous examples of techniques for shielding and/or guarding these routing traces.

Example Input Device

Figure 1:
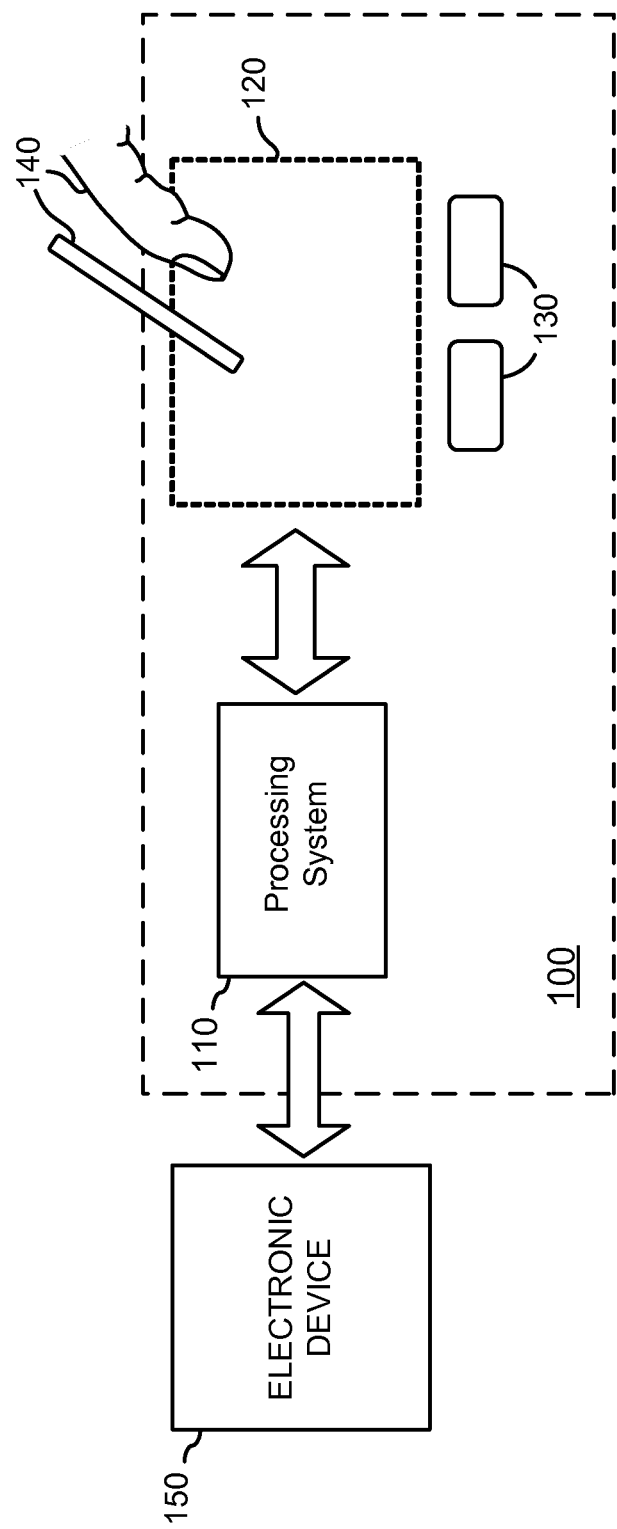
FIG. 1 is a block diagram of an example input device, in accordance with embodiments.

Turning now to the figures, FIG. 1 is a block diagram of an exemplary input device 100, in accordance with various embodiments. Input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

Input device 100 can be implemented as a physical part of the electronic system, or can be physically separate from the electronic system. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically-readable media include various discs, memory sticks, memory cards, memory modules, and the like. Electronically readable media may be based on flash, optical, magnetic, holographic, or any other tangible storage technology.

Example Sensor Electrode Pattern

Figure 2:
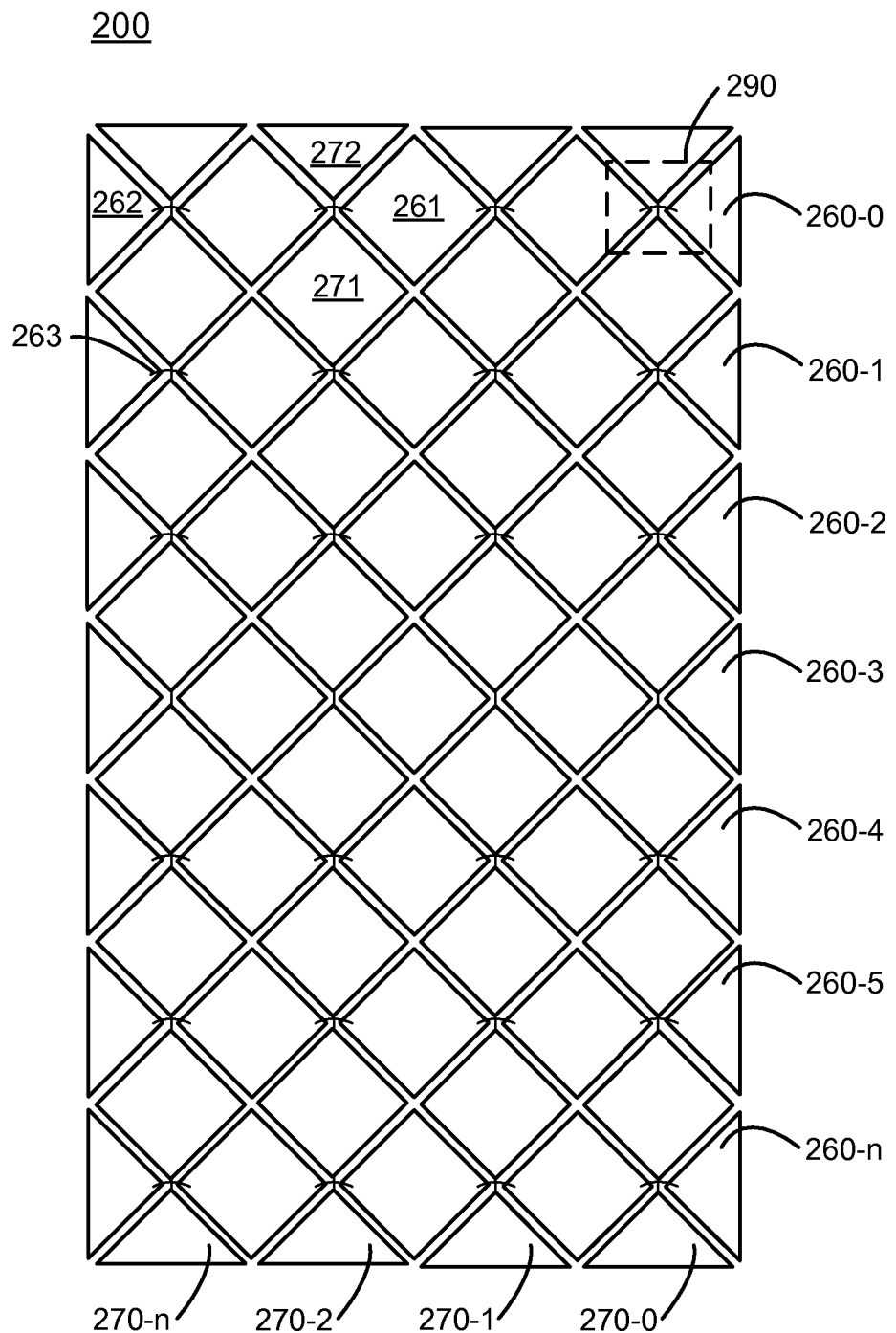
FIG. 2 shows a top plan view of a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a proximity sensor to generate all or part of the sensing region of input device 100, according to various embodiments. Input device 100 is configured as a capacitive input device when utilized with a capacitive sensor electrode pattern, such as pattern 200. For purposes of clarity of illustration and description, a non-limiting simple sensor electrode pattern 200 is illustrated in a top plan view; however, it is appreciated that numerous other sensor electrode patterns may be employed.

Sensor electrode pattern 200 includes a plurality of sensor electrode elements 261, 262, 271, 272 that are disposed in a single common layer with one another. In one embodiment, using jumpers 263, pluralities of sensor electrode elements 261 and 262 are ohmically coupled together to form transmitter electrodes 260 which are disposed on a first, left-right axis of FIG. 2. Pluralities of sensor electrode elements 271 and 272 are ohmically coupled together to form receiver electrodes 270 which are disposed on a second, up-down axis of FIG. 2. In this manner, the illustrated sensor electrode pattern 200 is made up of a plurality of receiver electrodes 270 (270-0, 270-1, 270-2 . . . 270-n) and a plurality of transmitter electrodes 260 (260-0, 260-1, 260-2 . . . 260-n) which exist in the same layer as one another (except for jumpers 263), in this example. It should be understood that the designations of "transmitter electrode" and "receiver electrode" are arbitrarily applied in this example and could be reversed depending on how the sensor electrodes are coupled with a processing system 100 (which may be in the form of an ASIC) that is used to operate sensor electrode pattern 200 as a capacitive sensing device. In a crossing single layer sensor electrode pattern, such as the illustrated example, some form of insulating material or substrate is typically disposed between at least the jumpers 263 at the crossing portions of transmitter electrodes 260 and receiver electrodes 270 to prevent ohmic coupling between transmitter electrodes 260 and receiver electrodes 270. It should be appreciated that in some embodiments, jumpers can be used with receiver electrodes 270 but not with transmitter electrodes 260. Likewise, in some embodiments, some jumpers may be used with both receiver electrodes 270 and transmitter electrodes 260.

In the illustrated example, touch sensing pixels are centered at locations where transmitter and receiver electrodes cross. Capacitive pixel 290 illustrates one of the capacitive pixels generated by sensor electrode pattern 200. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

Capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

In some transcapacitive embodiments, sensor electrode pattern 200 is "scanned" to determine these capacitive couplings that form capacitive pixels. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels.

In such a transcapacitive technique, a set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

One or more of the sensor electrodes (either the receiver electrodes 270, the transmitter electrodes 260, or both) may also be used to perform absolute capacitance sensing. In absolute capacitive mode, there is no distinction between a receiver or transmitter as sensor electrode is used for both transmitting and receiving by driving a voltage onto the sensor electrode and then sensing any change in the charge on the sensor electrode that may be caused by capacitive coupling to an input object. One or more sensor electrodes may be used at a particular time for absolute sensing, and various techniques such as profile sensing may be employed when absolute sensing is conducted with sensor electrodes of a sensor electrode pattern, such as sensor electrode pattern 200.

In some embodiments, absolute capacitive measurement techniques and transcapacitive measurement techniques can be used in combination in a capacitive input device 100. For example, in some embodiments, absolute capacitive measurement techniques may be used for sensing an input object 150 that is further away in a sensing region from an input surface of input device 100 while transcapacitive sensing techniques (to include capacitive imaging) are used to sense an input object 140 when it is closer to/in contact with an input surface of input device 100. It should be appreciated that there are a variety of other applications and uses for absolute and transcapacitive techniques in the same input device 100, and that this is but a single example.

Although not depicted, it is appreciated that routing traces are coupled to each of the sensor electrodes (260, 270) that are depicted in FIG. 2. Discussion of these routing traces and various deposition layers are described below in conjunction with various detail views.

Example Techniques for Guarding and/or Shielding Routing Traces

The example sensor electrode patterns that are described provide techniques for shielding and/or guarding sensor routing traces on sensors which help prevent artifacts in caused by "grip." "Grip" is undesired absolute capacitive coupling of the users gripping fingers to the receiver and transmitter routing outside the active sensor region of a sensor electrode pattern, such as sensor electrode pattern 200.

For example, a user's finger placed over the routing traces has of order 100 femtoFarads coupling to the traces, for typical dimensions of a finger. This is a much larger capacitive coupling than the proximity signal from a finger hovering over the sensor, which has a coupling on the order of 1 femtoFarad. As these signals cannot generally be distinguished by the ASIC/processing system (e.g., processing system 110) that is used to process the received signals from a proximity sensor, this interference prevents and/or distorts accurate hovering finger detection.

Any conductive shielding layer placed between the routing traces and the user's fingers will prevent direct capacitive coupling between the user's fingers and the routing traces. However if the conductor is not held at a well-defined potential, the user's fingers will couple to the layer and the layer will couple to the traces. The conductor will average the coupling to the users fingers to each routing trace according to its area (and capacitive coupling to the conductor), but not eliminate the grip signal.

During transcapacitive sensing it is desirable that the shielding layer be held at a fixed potential (e.g., ground or Vref). If it is also held at ground during absolute sensing (shielding approach), the capacitance between ground and routing is added to the background absolute capacitance. This capacitance is significant, and will often require increasing the range of absolute sensing to prevent saturating the receiver, reducing its sensitivity. In addition, the added background capacitance will vary (by trace area) between long and short traces. The variation in background capacitance must be kept within the range the ASIC can compensate without input saturation.

Rather than hoping that the variation in background capacitance is kept within the range the ASIC can compensate without input saturation, another approach (a guarding approach) can be used where the shield is modulated with a signal that is based on the sensing signal used for absolute capacitive sensing. This guarding signal may be the same as the sensing signal that is driven through one or more of the routing traces and onto one or more sensor electrodes or it may be a similar waveform with different amplitude. When using the guarding approach, the capacitance between the routing traces and guard does not contribute to the absolute measurement.

In the guarding approach a connection must be made between the shield layer and the ASIC that is utilized to transmit and receive on the sensor electrodes of a sensor electrode pattern. Shielding at ground requires only a connection from the shield to the ground plane of the device, and a solid connection to the ASIC ground without sources of interference in between. This can be simpler than having a direct connection from the shield to the ASIC.

It should be appreciated that the effective RC settling time of the guard or shield layer and connection must be shorter than the absolute sensing receiver integration time. For a reduction of the grip signal by a factor of 100, the time settling constant it must be ln(100)~=5 time shorter than the integration time. Typically this is in the range of 200 ns.

Generally guard traces are placed on each side of the routing traces that are being guarded in order to reduce background capacitance to the outer routing traces. In some embodiments, a strike ring of an electronic device may comprise the outer guard trace of a pair of guard traces that bracket one or more routing traces. However, to be fully effective at eliminating stray capacitive coupling, the guard or shield must completely cover the user side of the routing traces, overlapping the outer guard traces at the edges by at least half the gap to the guard/shield. The guard or shield should also be kept away from the active sensor area, so that it is not shielded. Generally it should be at least half a gap away. In many instances, the ground in housing of an electronic device and LCD module (e.g., the ground in a cellular phone, for example) will shield the traces to the capacitive sensing pattern from fingers touching the side of the electronic device when a user grips the electronic device.

The capacitive coupling between the guard or shield and each routing trace to a capacitive sensing pattern must be below a maximum input capacitance value defined by the receiver electrode design in both transcapacitive and absolute sensing. In many designs this maximum input capacitance value is typically in the range 10-100 pF.

With the above restrictions, there are a various ways to implement anti-grip shield or guarding conductors over routing traces. Numerous examples are illustrated and discussed below in conjunction with FIGS. 3-9. In FIGS. 3-9, dimensions are not to scale in order to more easily show the different layers and components involved. In the illustrated techniques shown in FIGS. 3-9, guard traces are placed in the same layer as the routing signals. Other conventional shielding/guarding techniques require an additional conductive layer and sometime an additional dielectric layer in the sensor; these additional layers are not required in the embodiments described herein. Similarly, as illustrated in FIG. 9, if anti-guard traces are included in an embodiment illustrated in FIGS. 3-8, they may also be disposed placed in the same layer as the guard traces and the routing traces.

Figure 3:
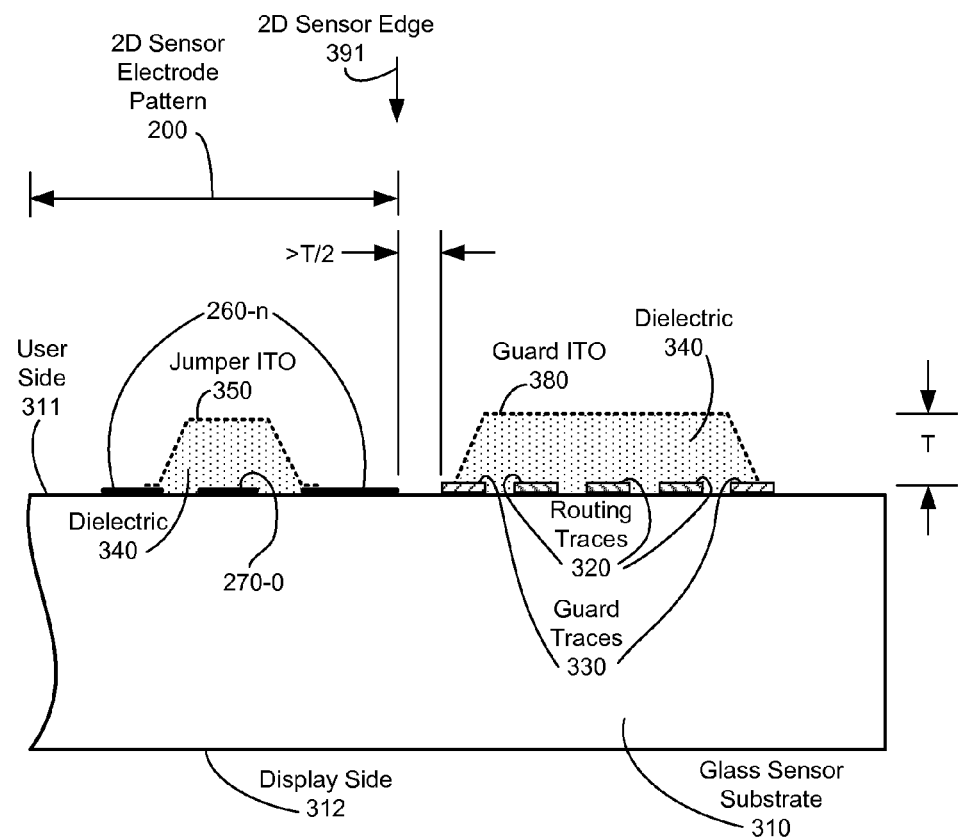
FIG. 3 shows a cross-section of routing traces and a portion of a sensor electrode pattern of an input device on a face-up glass sensor guarded by jumper layer Indium Tin Oxide (ITO) backed up by parallel metal guard traces in the routing layer.

FIG. 3 shows a cross-section 300 of routing traces 320 and a portion of a sensor electrode pattern 200 on a face-up glass sensor guarded by jumper layer Indium Tin Oxide (ITO) 350 backed up by parallel metal guard traces 330 in the routing layer.

FIG. 3 shows an example of a guard trace 380 formed in the ITO jumper layer 350 which is part of a standard glass (sometimes single layer PET) sensor design consisting of metal routing traces, two ITO layers (ITO 1 and ITO 2), and a dielectric layer. Two-dimensional sensor electrode pattern 200 is face-up, with the patterned layers on user side 311, which is opposite of display side 312 of glass sensor substrate 310. In the illustrated embodiment, the jumper layer of ITO 2 which forms the guard/shield 380 and couples the metal guard traces 330 is the last layer deposited (see e.g., key 301 for layer deposition ordering) so it covers routing traces 320 and ohmically connects parallel guard traces 330. This jumper 380 between guard traces 330 can be disposed, such as by a deposition action, at the same time as the ITO 2 jumper layer 350 which jumpers together portions of sensor electrodes (e.g., sensor electrode 260-*n* as depicted) in sensor electrode pattern 200; likewise, the dielectric 340 between the routing traces 320 and the guard ITO 380 can be disposed, such as with a deposition action, at the same time the dielectric layer 340 used in sensor electrode pattern 200, thus no extra patterning layers are required to dispose the guard ITO 380 or the guard dielectric 340. To reduce the RC time constant of the ITO guard 380, it is connected in parallel along its length to guard traces 330 on bracketing the sides of the routing traces 320 (the length in cross-section 300 of FIG. 3 would be along a z-direction into the figure). This parallel connection can be continuous or can comprise multiple connections along the length. The dielectric layer 340 beneath guard ITO 380 (which is not shown to scale) may be thicker than typical (e.g., a thickness of 4-5 microns instead of the normal thickness of 1-2 microns) so that the capacitance between the user side of guard ITO 380 and routing traces 320 is in the 10-100 pF limit mentioned above. This thickness creates a gap T between the routing traces 320 and guard ITO 380 disposed above routing traces 320. Guard ITO 380 is spaced at least half this gap, T/2, from the closest edge 391 active sensor area of sensor electrode pattern 200. Although not depicted in FIG. 3, there is typically a lens or cover of some sort disposed between sensor electrode pattern 200 and a user.

Figure 4:
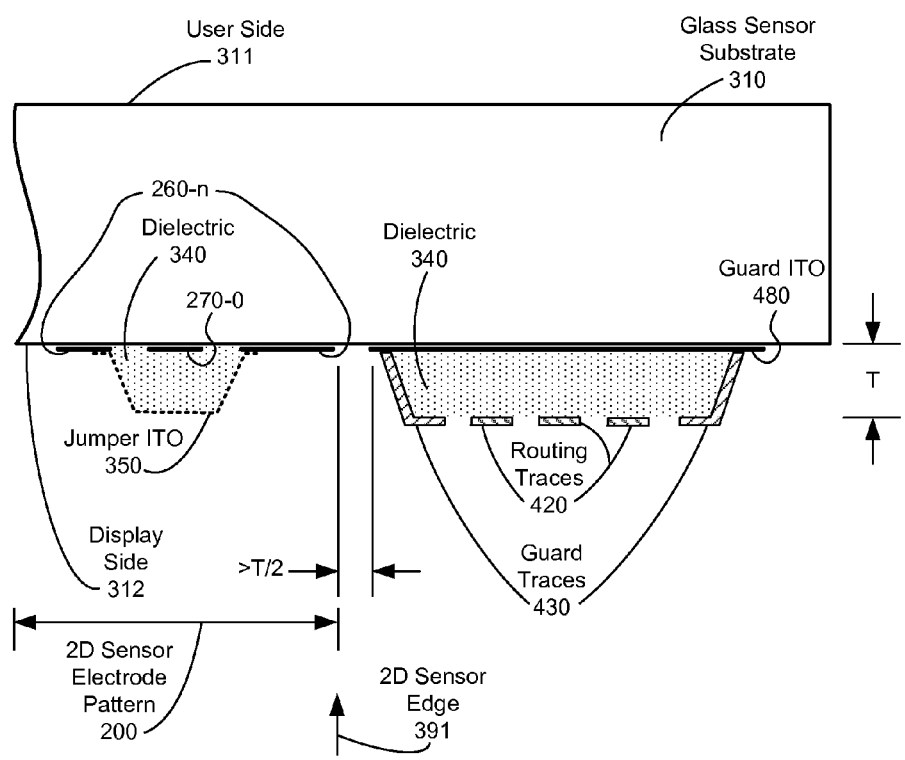
FIG. 4 shows a cross-section of routing traces on a face-down glass sensor or sensor-on-lens guarded by sensor ITO backed up by parallel metal guard traces in the routing layer.
Figure 4:
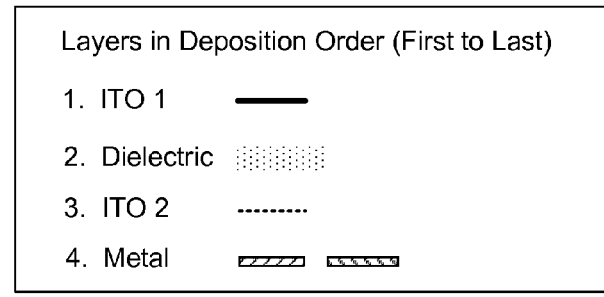

FIG. 4 shows a cross-section 400 of routing traces 420 on a face-down glass sensor or sensor-on-lens guarded by sensor layer guard ITO 480 backed up by parallel metal guard traces 430 in the routing trace layer. Here the metal routing traces 420 in the routing trace layer are deposited after the other conductors (e.g., sensor electrode 260-n, sensor electrode 270, and guard ITO 480) and dielectric layer 340.

In FIG. 4, the design is similar to that of FIG. 3 except that the sensor components are inverted and disposed on the display side 312 of glass sensor substrate 310 rather than on user side 311. Because of this, in FIG. 4, sensor ITO layer (ITO 1) is used for guard/shield ITO 480 instead of the jumper ITO layer (ITO 2), as depicted in cross-section 300. The order of the layers (as shown in key 401) is changed so that the guard/shield layer, where guard ITO 480 is located, is on the user side of the stack. The metal guard traces 430 in FIG. 4 are three-dimensional and are disposed, such as with a deposition action, at the same time as the two-dimensional metal routing traces 420. Guard traces 430 are connected together by the guard/shield ITO 480 that is formed in deposition of ITO 1. As with FIG. 3, this design of FIG. 4 utilizes the stack layers that would already be in use in sensor electrode pattern 200, but in a different way, to provide improved guarding/shielding, and thus no additional layers or patterning steps are required to implement the design illustrated in cross-section 400 versus a conventional design.

Figure 5:
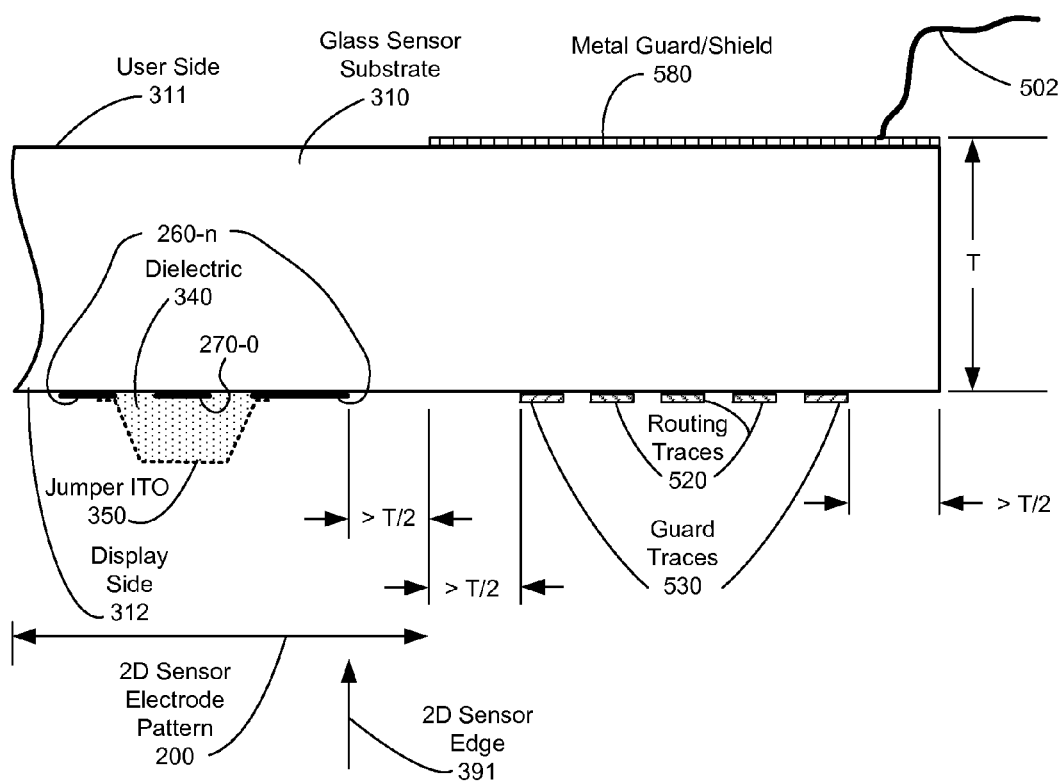
FIG. 5 shows a cross-section of routing traces on a face-down glass sensor guarded with a dedicated conductive layer on the opposite side from the sensor.

FIG. 5 shows a cross-section 500 of routing traces 520 on a face-down glass sensor guarded with a dedicated conductive layer on the opposite side from the sensor.

FIG. 5 shows an example of a guard or shield layer 580 formed by an additional conductor deposited on the upper side of a face down sensor. The layers and ordering of deposition for forming sensor electrode pattern 200, routing traces 520, and guard traces 530 are shown in key 501. In cross-section 500, one additional layer and step to those of key 501 may be required in the construction of the guard/shield layer 580 as compared to the number of layer/steps in formation of sensor electrode pattern 200. In some embodiments, when the metal guard/shield 580 is far enough outside the viewing area associated with a display of an electronic device (e.g., 150) in which it is disposed, the conductor used to form it may be opaque (e.g., metal such as that used for a routing trace) instead of being formed from a substantially transparent conductor, such as ITO. In some embodiments, where the thickness, T, of glass sensor substrate 310 between the metal guard/shield 580 on user side 311 and metal routing traces 520 on display side 312 is thick enough to keep the capacitive coupling to metal routing traces 520 below the desired limits, using a ground connection 502 as a shield instead of using a modulated signal as a guard can eliminate the requirement for a guard connection back to the ASIC which operates sensor electrode pattern 200. In FIG. 5, because of the thickness, T, of the substrate between user side 311 metal guard/shield 580 and routing traces 520 on display side 312, metal guard/shield 580 is extended outward to fully cover routing traces 520 and so that routing traces 520 cannot be viewed by a user looking through glass sensor substrate 310 at an angle. In one embodiment, if a gap of thickness T exists between user side 311 metal guard/shield 580 and routing traces 520, then user side 311 metal guard/shield 580 is extended laterally beyond the display side 312 guard traces 530, and towards sensor electrode pattern 200, by at least a distance of T/2. It is appreciated that a lens layer and/or cover, not shown in FIG. 5, may exist between user side 311 of glass sensor substrate 310 and a user. In various embodiments, guard traces 530 may tie back to the same pin on an ASIC which operates sensor electrode pattern 200 or to different pins on the ASIC. Likewise, when guarding is in use rather than shielding, metal guard 580 and one or both of guard traces 530 may be ohmically coupled with one another or ohmically separated.

Figure 6:
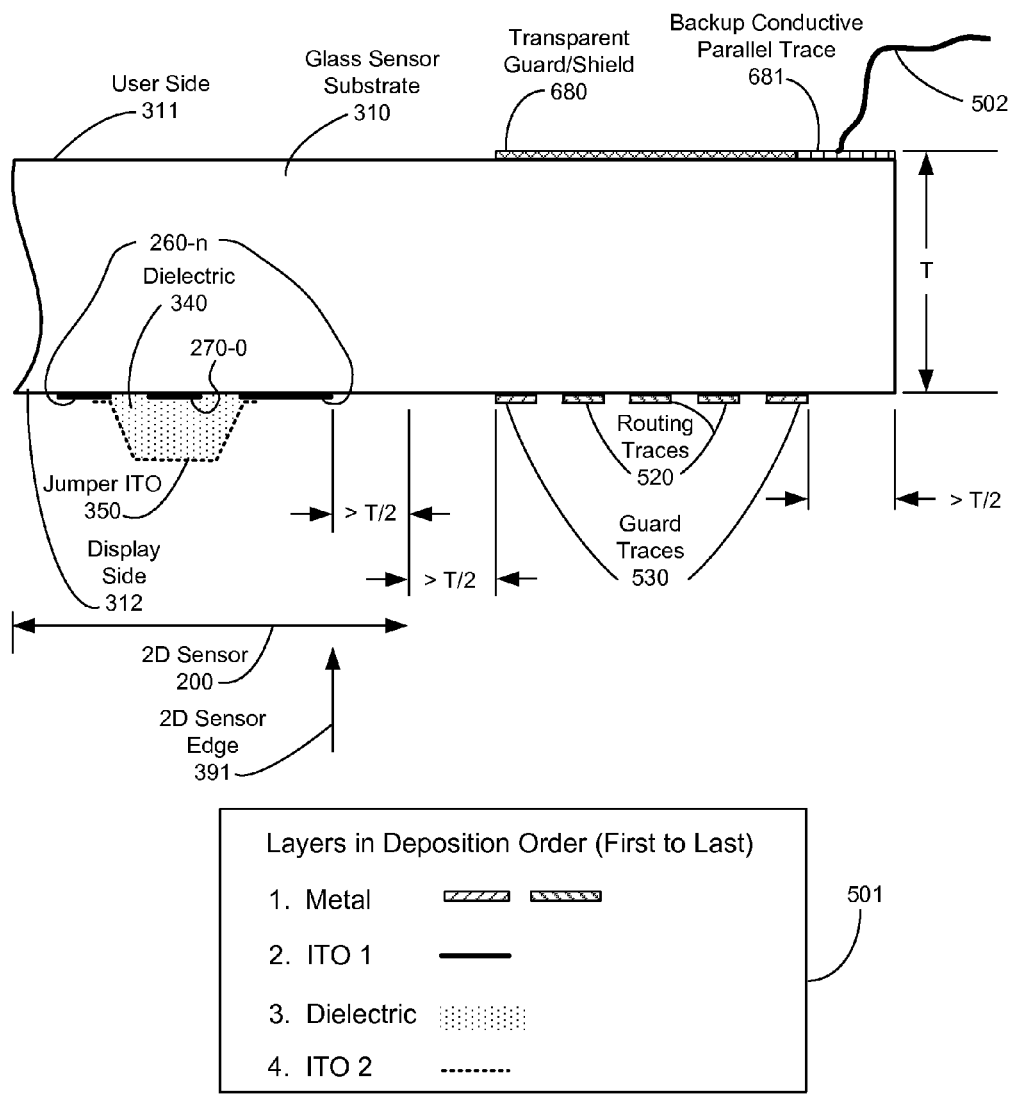
FIG. 6 shows a cross-section of routing traces on a face-down glass sensor guarded with two dedicated conductive layers on the opposite side from the sensor.

FIG. 6 shows a cross-section 600 of routing traces on a face-down glass sensor guarded with two dedicated conductive layers on the opposite side from the sensor. The layers and ordering of deposition for forming sensor electrode pattern 200, routing traces 520, and guard traces 530 are shown in key 501. FIG. 6 is similar to FIG. 5, except two additional layers, beyond those in key 501, are used rather than the one additional layer illustrated in FIG. 5. Transparent guard/shield 680 is the first of these two layers, and is adjacent to sensor electrode pattern 200. Transparent guard/shield 680 is transparent, conductive, and completely covers metal routing traces 520. In some embodiments, transparent guard/shield 680 may not be very conductive and in fact may be considered resistive. Because the first of the two layers is transparent it may be placed close to the viewing area of a user without being visible or blocking the display which is located on display side 312. Backup conductive parallel trace 681 is the second of these two conductive layers, and forms a high conductivity backing trace that is connected to transparent guard/shield 680 along its length (where the length would be in a z-dimension with respect to the depicted cross-section 600). Backup conductive parallel trace 681 may be formed of an opaque conductive material so long as it is far enough outside the viewing area associated with a display of an electronic device 150 in which it is disposed. With this backing trace 681, the sheet resistance of the transparent first of the two layers (transparent guard/shield 680) may be as high as 100 kOhm/sq, in some embodiments, without exceeding the guard/shield RC time constant requirements of the associated sensor electrode pattern 200.

Figure 7:
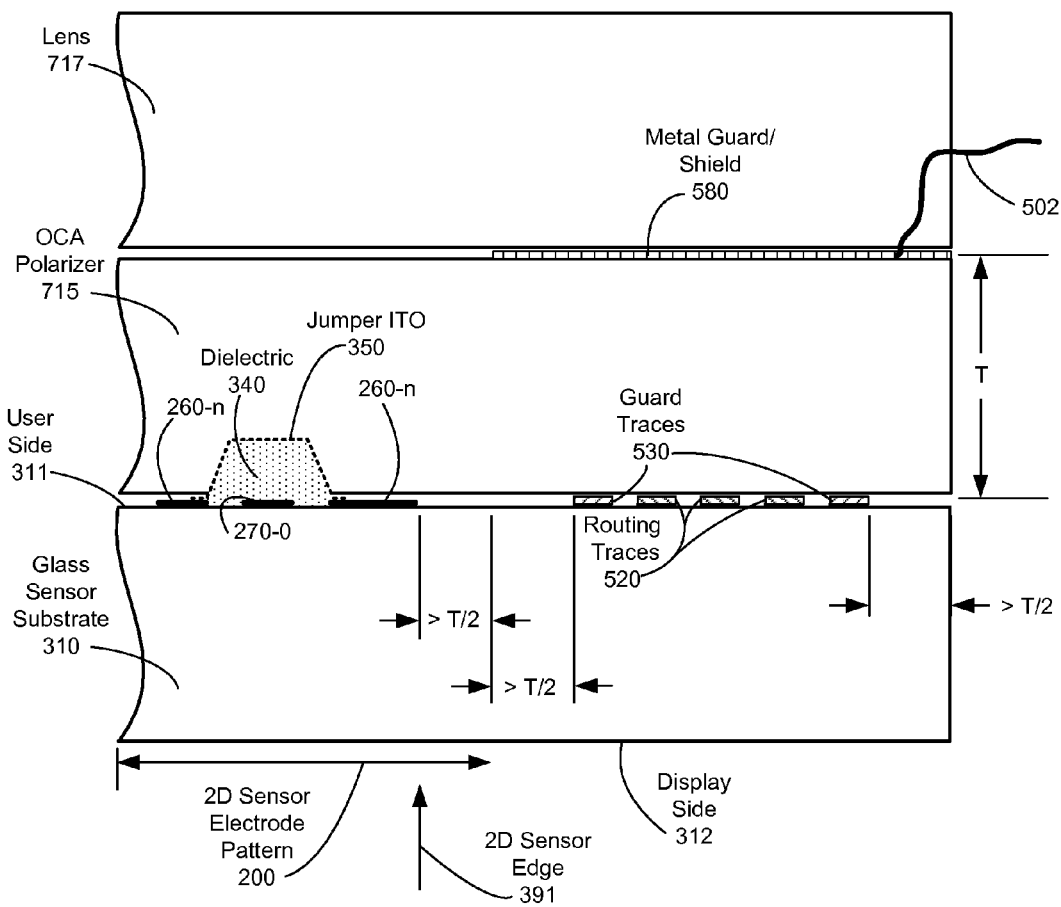
FIG. 7 shows a cross-section of routing traces on a face-up glass sensor guarded with a dedicated conductive layer on the inside of the lens.

FIG. 7 shows a cross-section 700 of routing traces on a face-up glass sensor guarded with a dedicated conductive layer, metal guard/shield 580, on the inside of the lens 717. FIG. 7 is similar to FIG. 5, except that the sensor electrode pattern 200, routing traces 520, and guard traces 530 are face-up on user side 311 of glass sensor substrate 310 and guard/shield 580 is placed on the inside of lens 717, separated by from sensor electrode pattern 200, routing traces 520, and guard traces 530 by an optically clear adhesive (OCA) 715 (and, in some embodiments, by a display polarizer). This is different than in FIG. 5 where the guard/shield 580 is on the opposite side of glass sensor substrate 310 from the routing traces 520, guard traces 530, and sensor electrodes (260, 270) of sensor electrode pattern 200. As with the embodiment of FIG. 5, in some embodiments, when guard/shield layer 580 is far enough outside the viewing area associated with a display of an electronic device 150 in which it is disposed, the conductor used to form it may be opaque (e.g., metal) instead of being formed from a substantially transparent conductor such as ITO. Similar to FIG. 5, in some embodiments, where the thickness of the OCA/Polarizer 715 is enough to keep the capacitive coupling between the guard/shield 580 and routing traces 520 below the necessary limits, using ground as a shield instead of guard may be used to eliminate the guard connection back to the ASIC which operates sensor electrode pattern 200. While the guard/shield layer 580 is an additional layer to those shown in key 501, it is deposited on a different substrate (e.g., lens 717) than the sensor electrodes (260, 270), routing traces 520, and guard traces 530. In other embodiments, an intervening layer (such as PET) may be disposed between lens 717 and the OCA/polarizer 715, and the user side guard/shield 580 may be disposed on this intervening layer rather than upon lens 717 as is depicted in FIG. 7.

Figure 8:
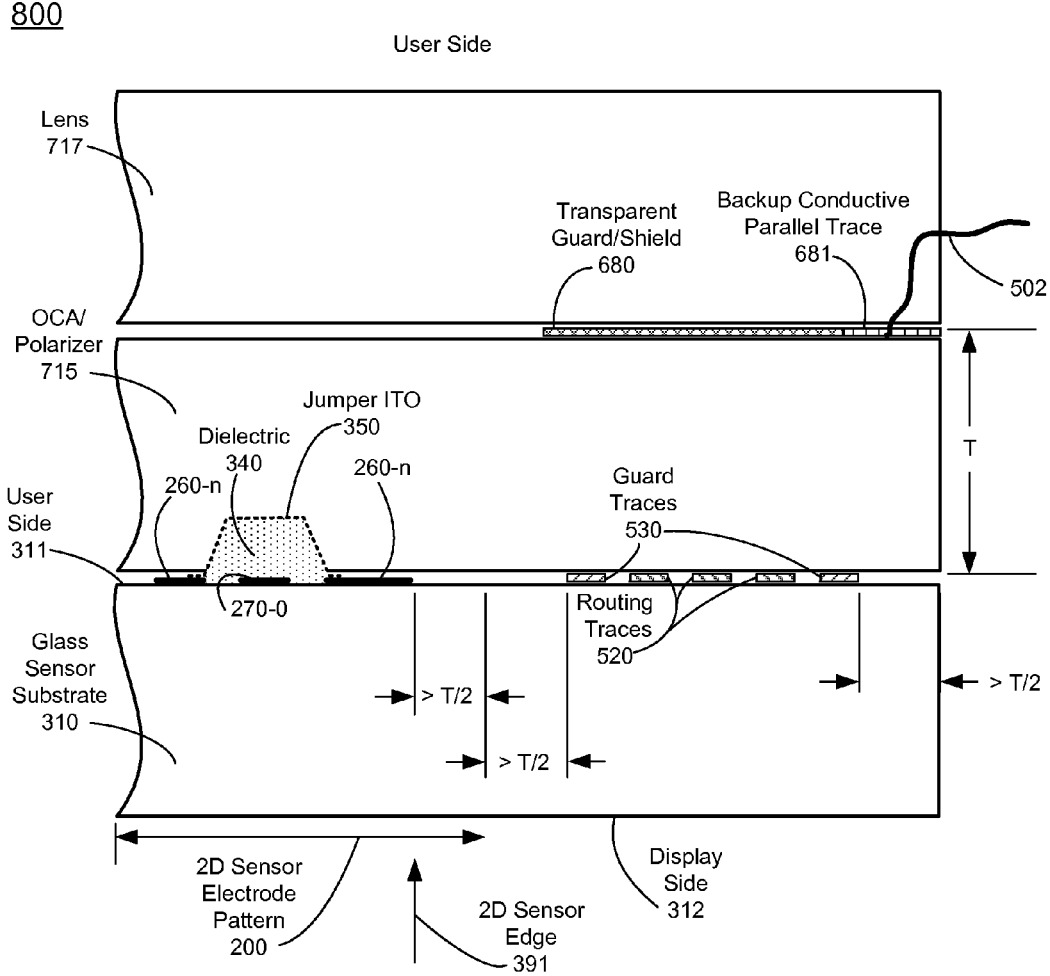
FIG. 8 shows a cross-section of routing traces on a face-up glass sensor guarded with two dedicated conductive layers on the inside of the lens.
Figure 9:
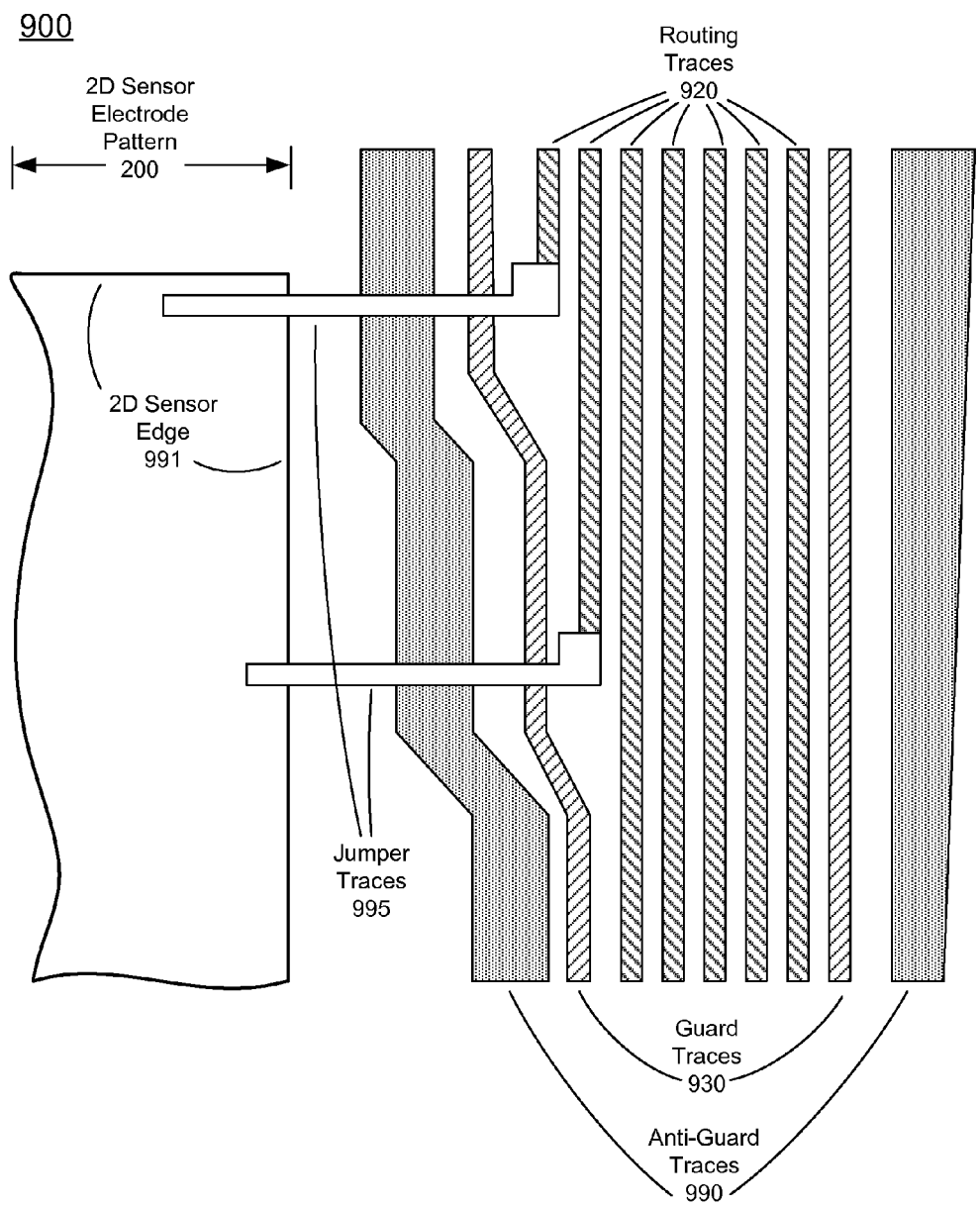
FIG. 9 shows a top plan view of a portion of a sensor electrode pattern along with routing traces for a sensor electrode pattern using differential guarding, according to an embodiment.

FIG. 8 shows a cross-section 800 of routing traces 520 on a face-up glass sensor guarded with two dedicated conductive layers (680 and 681) on the inside of the lens 717. FIG. 8 is similar to FIG. 6, except that the sensor is face-up like in FIG. 7. As in FIG. 6, the resistive transparent guard/shield 680 and additional conductive backing trace 681 are placed on the inside of lens 717. As with the embodiment of FIG. 6, the first of these two layers, transparent guard/shield 680, is transparent, made of material such as ITO, and completely covers routing traces 520. However, as with FIG. 6, transparent guard/shield 680 may not be very conductive (e.g., may be resistive). Also, like the embodiment of FIG. 6, the second of these two conductive layers (backup conductive parallel trace 681) forms a high conductivity backing trace that is ohmically connected to transparent guard/shield 680 along its length (where the length would be in a z-dimension with respect to the depicted cross-section 800). Backup conductive parallel trace 681 may be formed of an opaque conductive material, such as a similar metal used in routing traces 520, so long as it is far enough outside the viewing area associated with a display of an electronic device 150 in which it is disposed. With backup conductive parallel trace 681, the sheet resistance of transparent guard/shield 680 may be as high as 100 kOhm/sq, in some embodiments, without exceeding the guard/shield RC time constant requirements of the associated sensor electrode pattern 200. While the guard/shield 680 and backing trace 681 are in additional layers, they are deposited on a different substrate (e.g., lens 717) than the sensor electrodes (260, 270), routing 520, and guard traces 530. In other embodiments, an intervening layer (such as PET) may be disposed between lens 717 and the OCA/polarizer 715, and the user side guard/shield 680 and backing trace 681 may be disposed on this intervening layer rather than upon lens 717 as is depicted in FIG. 8.

Incorporation of Anti-Guard Traces

Anti-guard traces may be employed in virtually any capacitive input device which employs guard traces. They may be employed with a sensor electrode pattern which disposes sensor electrode elements in a single layer (e.g., sensor electrode pattern 200 of FIG. 2) or in a sensor electrode pattern in which sensor electrodes are disposed, such as by deposition, in different layers from one another.

In an electronic device, the finger of a user placed over typical routing traces, while gripping the electronic device, has of order 50 femtoFarads coupling to the traces, for typical dimensions. This is much larger than the proximity signal from a finger hovering over the sensor of a capacitive sensing device, which is of order 1 femtoFarad. As these signals cannot generally be distinguished from one another by the ASIC which is used to process signals from a capacitive sensor pattern, this interference from a gripping finger or figures prevents hovering finger detection.

Conventional methods of shielding the routing traces use a separately patterned conductive layer between the routing and the user which is held at a well-defined potential. This can be a DC potential or, to reduce background capacitance, a guard signal modulated with the same amplitude as the sensor routing traces during absolute capacitance measurements.

Figure 10:
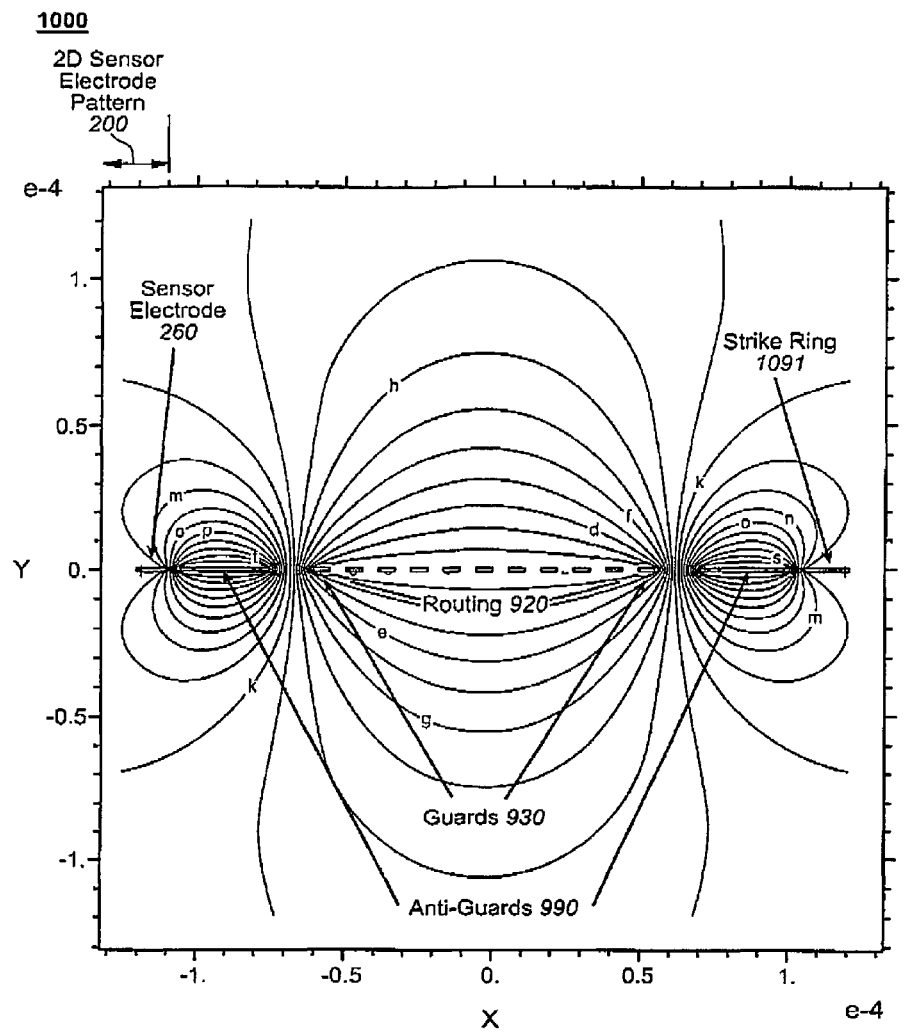
FIG. 10 shows a cross-section of routing traces where a two-dimensional cross-sectional finite element model of the electrical potentials is illustrated near the routing traces and anti-guard traces, according to an embodiment.

The techniques described herein with respect to FIGS. 9 and 10 create a near virtual ground (or DC potential) near the gripping finger(s) of a user with anti-guard traces that are disposed only in the routing layer.

FIG. 9 shows a top plan view 900 of routing traces for a sensor electrode pattern using differential guarding, according to an embodiment. Differential guarding uses both guard and anti-guard traces bracketing routing traces. As is illustrated in FIG. 9, "anti-guarding" traces 990 have been added parallel to the routing traces 920 and bracketing the guard traces 930. It should be appreciated that such anti-guard traces 990 can similarly be added to any of the embodiments described in FIGS. 3-8, or used independently from such embodiments. These anti-guard traces 990 are modulated by the ASIC associated with a capacitive sensor electrode pattern 200 which drives and receives signals using the routing traces 920. The anti-guard traces 990 may be held at a fixed potential during transcapacitive measurements (e.g., ground or another fixed potential). When conducting absolute capacitive sensing, the anti-guard traces 990 are modulated with a differential signal that is out of phase with the modulated signal that is driven on both the guard traces 930 and the sensor routing traces 920 during absolute capacitance measurements, such that the total electrical field above the collection traces (routing traces, guard traces, and anti-guard traces) is at or near zero. For example, in many embodiments, during absolute sensing, the guarding signal that is driven on the guard traces 930 is the same (or else is the same waveform with greater or lesser amplitude) as the sensing signal that is driven on one or more or the bracketed routing traces 920. In some embodiments, when conducting absolute capacitive sensing, the anti-guard traces 990 are modulated with an out-of-phase signal that is the inverse of the sensing signal that is driven on at least one of the routing traces 920 during absolute capacitance measurements. It should be appreciated that an inverse of the sensing signal is not used in all absolute capacitive measuring embodiments, though it may be convenient. In some absolute capacitive measuring embodiments, the anti-guard signal has substantially the same amplitude as the sensing signal being driven on the routing traces 920, while in others the amplitudes differ. In some embodiments, trace widths of the routing traces 920, guard traces 930, and anti-guard traces 990 can be scaled to compensate for modulation amplitude differences during absolute capacitance measurement. A processing system, such as processing system 100, which is coupled to the routing traces 920, guard traces 930, and anti-guard traces 990 operates to drive the sensing signals, guarding signals, and anti-guarding signals.

As can be seen, in the illustrated embodiment, the guard traces 930 and routing traces 920 have approximately similar widths in a left-to-right measurement of width in FIG. 9 and are substantially constant in width along their up-down length in FIG. 9, while in the left-right width dimension the anti-guard traces 990 vary in width along their up-down length and are much wider than any guard trace 930 or routing trace 920. In the limit condition where the finger of a user is hovering far away (e.g., at the designed limit of hover detection) above a sensor electrode pattern, the width of the anti-guard traces 990 would be optimal when the average potential across all the routing 920, guard 930, and anti-guard traces 990 is DC (e.g., ground or Vref). This average includes the potential at gaps between traces. The approach is similar to using differential signals on a twisted pair of conductors to prevent interference. Optimizing for closer fingers, the anti-guarding traces 990 would be slightly wider than in the ideal far-finger case. Bearing these concepts in mind, the width of the anti-guard traces 990, for use in a particular electronic device, can be determined experimentally or with finite element modeling (FEM).

As long as the total width of the traces is small compared to the minimum distance to a gripping finger of a user, the potential at the gripping finger will be nearly a uniform DC potential even when the traces are modulated. The presence of the gripping fingers does not significantly affect the absolute capacitance of the routing traces.

In one embodiment, for optimal shielding the routed signal and anti-guarding signals would be as close together as possible. However, this layout will generally add far too much background capacitance to the routing traces 920. For example, the optimally shielded layout has alternating sensor routing (+) and anti-guarding (−) traces, as −+−+−+−+−. With this arrangement the background capacitance signal to the routing would be huge. A slightly better configuration is to reverse every other trace pair, −++−−++−−+−. This still has high background capacitance, typically 1 or 2 picoFarads per centimeter of routing trace length.

With some reduction in shielding effectiveness, the anti-guarding 990 and signal traces 920 may be separated further to reduce background capacitance. To further reduce background capacitance, guarding traces 930 may be placed between the signal routing and anti-guarding traces, as illustrated in FIG. 9. These guard traces 930 are driven by the ASIC of a capacitive sensing device (e.g., processing system 100) with the same modulation as the routing traces during absolute sensing.

In FIG. 9, there are seven routing traces 920 that are disposed in a routing region that is outside of the active sensor area of sensor electrode pattern 200 to which the routing traces 920 are coupled. On each side of this grouping of seven routing traces 920 are two guard traces 930 that are also disposed in this routing region. The pair of guard traces 930 bracket the grouping of routing traces 920. In some embodiments, the pair of guard traces 930 may be ohmically coupled to one another or connected to the same pin of the ASIC which operates the capacitive sensing pattern to which the routing traces 920 are coupled. Outside these guard traces 930 on each side are wide anti-guard traces 990 which bracket the pair of guard traces 930. The anti-guard traces 990 are also disposed, such as by a deposition process, in the routing area where the routing traces 920 and guard traces 930 are located. The anti-guard traces 990 are approximately half the total width of the routing 920 and guard 930 group of traces, such that the AC component of the average potential is near zero. Both of the anti-guarding traces 990 can be connected to the same ASIC pin or to different pins of the ASIC which is used to operate sensor electrode pattern 200. In some embodiments, the routing area is a region that cannot be viewed by a viewer looking at the touch display formed by the active sensor area of sensor electrode pattern 200.

To get to the sensor area and couple with sensor electrodes, the routing traces 920 pass over or under the guard 930 and anti-guarding 990 traces on another layer using a jumper trace 995 that is separated by an insulator layer (not depicted) from the guard 930 and anti-guard traces 990. There will be a small added background capacitance from crossing over the anti-guard 990, which is about twice the value of crossing over a guard trace.

The width of the anti-guarding traces 990 is reduced along their length as each routing trace 920 leaves the bundle going to a sensor electrode of the capacitive sensor. At each point, the width of the anti-guarding 990 traces is chosen such that the absolute capacitance added to the routing traces 920 by a finger on (or near) the sensor is nearly zero. The width reduction of an anti-guard trace 990 can be effected by stair stepping as shown in the left anti-guard trace 990 of FIG. 9, or by a gradual constant reduction along the length of the anti-guard trace 990 as is shown in the right anti-guard trace of FIG. 9. In some embodiments, a strike ring that is used in an electronic device may be used or configured for use as one of the two anti-guard traces 990. For example, the right most anti-guard trace 990 in FIG. 9 (which is most distant from the sensor electrodes) may comprise a strike ring. In some embodiments a transient voltage suppressor may be utilized when a strike ring is operated as an anti-guard trace. In some embodiments, only one anti-guard trace may be employed.

In one alternative embodiment, instead of narrowing the anti-guard traces 990 when a routing trace leaves the bundle of routing traces 920 to couple with a sensor electrode, the remaining routing traces 920 can be slightly widened while the left-right width of the anti-guard traces 990 remains constant. Other variations may also be employed, in some embodiments, such as slightly narrowing the anti-guard traces 990 while slightly widening the routing traces 920 as a routing trace leaves the bundle to couple with a sensor electrode.

FIG. 10 shows a cross-section 1000 of routing traces, such as those of FIG. 9, where a two-dimensional cross-sectional finite element model of the electrical potentials is illustrated near the routing traces 920 and anti-guard traces 990, according to an embodiment. For simplicity of illustration and description the routing pattern bundle (routing traces 920, guard traces 930, anti-guard traces 990) is surrounded by a constant dielectric 8 material to simulate glass. The top surface of the glass is 0.5 mm above the routing traces. Without the anti-guards 990 the coupling to a gripping finger (or other ground) on the glass is 20 femtoFarads/cm per trace. With optimized anti-guards 990, the coupling to a gripping finger is reduced to between −1 and +1 femtoFarads/cm, varying by trace.

The X and Y scales of the electric potential field lines in FIG. 10 are in $10^{-4}$ millimeters. The scale on the left side of FIG. 10 indicates that most of the field lines from the routing traces couple back to the traces or guards within a distance of less than about 120 microns (only one field line goes above this distance), which is far less than the distance needed to extend beyond a 0.5 mm (500 microns) thick glass surface disposed above the routing traces. This means that using the differential guarding techniques shown herein, field lines from the traces are controlled (they go up quickly and curl back to the anti-guards) such that they do not extend far enough above the traces for a gripping finger to cause much, if any, capacitive interaction with the field lines. This substantially or completely eliminates grip interference that can interfere with the detection of a hovering user finger during absolute capacitive sensing. Had differential guarding techniques not been employed the field lines from the routing traces would have extended far past 0.5 mm and thus would easily be subject to interaction from a gripping finger or fingers of a user that wrap around the edges of an electronic device and overlap all or portion of the routing traces as the user holds the electronic device while operating it.

With continued reference to FIGS. 9 and 10, an obvious variation, in some embodiments, is splitting the routing trace bundle into two (or more) routing trace bundles with anti-guarding trace(s) in between. For two side-by-side bundles of routing traces, there would be a total of four guard traces on the sides of the routing traces and three anti-guard traces. Reducing the width of the routing trace bundle would improve the shielding, but would take more space.

In FIG. 10, strike ring 1091 is disposed outside of the anti-guard trace 990 which is most distant from sensor electrode pattern 200. In one embodiment, strike ring 1091, may take the place of the anti-guard trace that it is positioned next to, such that strike ring 1091 and the remaining anti-guard trace 990 bracket routing traces 920 and guard traces 930.

A limiting case of case of different anti-guard modulation is zero modulation. In this limiting case, the anti-guarding traces are simply grounded (zero modulation) and are made very wide, up to of order the routing trace to-gripping finger distance. This will take a considerable space and may not completely shield the routing traces, but may shield them well enough for some designs.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A capacitive input device comprising:
   a processing system;
   a sensor electrode pattern disposed on a first side of a substrate and comprising:
      a plurality of sensor electrode elements disposed on said first side of said substrate;
      a first subset of said plurality of sensor electrode elements ohmically coupled into groups to form a first array of sensor electrodes oriented along a first axis; and
      a second subset of said plurality of sensor electrode elements ohmically coupled into groups by a plurality of jumpers to form a second array of sensor electrodes oriented along a second axis which is different from said first axis, wherein a first insulator is disposed between each of said plurality of jumpers and said first subset of said plurality of sensor electrode elements;
   a plurality of routing traces disposed along a first edge of said sensor electrode pattern on said first side of said substrate and configured to communicatively couple at least some of said sensor electrodes with said processing system;
   a pair of guard traces disposed outside of said sensor electrode pattern, along said first edge, in the same layer as said plurality of routing traces such that said pair of guard traces brackets said plurality of routing traces;
   a guard overlapping said routing traces and disposed proximate said routing traces on said first side of said substrate, and wherein said guard ohmically couples said pair of guard traces with one another by extending over said routing traces between a first coupling to a first of said pair of guard traces and a second coupling to a second of said pair of guard traces; and
   a second insulator disposed between said routing traces and said guard, wherein said second insulator and said first insulator are disposed in the same layer, wherein a thickness of said second insulator creates a maximum gap of T between said routing traces and said guard, and wherein said guard is spaced a distance of at least T/2 from a closest edge of an active sensor area of said sensor electrode pattern;
   wherein said processing system is configured to:
      during transcapacitive sensing with said sensor electrode pattern, hold said guard at a constant potential; and
      during absolute capacitive sensing with said sensor electrode pattern, modulate said guard with a guard signal that is based on a sensing signal driven through a routing trace.

2. The capacitive input device of claim 1, further comprising a pair of anti-guard traces disposed in the same layer as said guard traces and bracketing said pair of guard traces.

3. The capacitive input device of claim 1, wherein a deposition order from first to last is said routing traces, then said sensor electrode elements, then said first and second insulators simultaneously, then said guard.

4. A capacitive input device comprising:
   a processing system;
   a sensor electrode pattern comprising a plurality of sensor electrodes;
   a plurality of routing traces disposed on a first side of a substrate in a routing region outside of an active sensing area of said sensor electrode pattern and configured to communicatively couple at least some of said sensor electrodes with said processing system, wherein no sensor electrodes are disposed in said routing region;
   a first anti-guard trace disposed on said first side of said substrate in said routing region and located between said sensor electrode pattern and said routing traces;
   a second anti-guard trace disposed on said first side of said substrate in said routing region and located between an edge of said substrate and said plurality of routing traces such that said plurality of routing traces is bracketed between said first and second anti-guard traces and such that no sensor electrodes are bracketed between said anti-guard traces;
   a pair of guard traces disposed on said first side of said substrate in said routing region such that said plurality of routing traces is bracketed between said pair of guard traces and said pair of guard traces and said plurality of routing traces are bracketed between said first anti-guard trace and said second anti-guard trace, wherein said processing system is configured to hold said guard traces at a constant potential during transcapacitive sensing with said sensor electrode pattern, and wherein during absolute capacitive sensing with said sensor electrode pattern said first and second anti-guard traces are configured to be driven with a differential signal which is out of phase with a sensing signal that is driven on a routing trace of said plurality of routing traces during said absolute capacitive sensing with said sensor electrode pattern;

a guard overlapping said routing traces and disposed proximate said routing traces on said first side of said substrate, wherein said guard ohmically couples said pair of guard traces with one another by extending over said routing traces between a first coupling to a first of said pair of guard traces and a second coupling to a second of said pair of guard traces; and an insulator disposed between said routing traces and said guard, wherein a thickness of said insulator creates a maximum gap of T between said routing traces and said guard, and wherein said guard is spaced a distance of at least T/2 from a closest edge of an active sensor area of said sensor electrode pattern.

5. The capacitive input device of claim 4, further comprising:

jumpers configured for coupling said routing traces past said anti-guard traces to sensor electrodes of said capacitive sensing pattern.

6. The capacitive input device of claim 4, wherein said second anti-guard trace comprises a strike ring of said capacitive input device.

7. The capacitive input device of claim 4, wherein said differential signal comprises a waveform that is an inverse of said sensing signal at a different amplitude than said sensing signal.

8. The capacitive input device of claim 4, wherein said differential signal comprises a waveform that is an inverse of said sensing signal at the same amplitude as said sensing signal.

9. The capacitive input device of claim 4, wherein minimum widths of said first and said second anti-guard traces are defined by a measurement of the average potential of any traces, and gaps therebetween, disposed in said routing region.

10. The capacitive input device of claim 4, wherein total combined widths of said first and second anti-guard traces is approximately equal to the combined widths of said plurality of routing traces.

* * * * *